UNITED STATES PATENT OFFICE.

HENRY FRANCIS MILLS, OF LONDON, ENGLAND.

COMPOUND FOR TREATMENT OF NEURALGIA.

SPECIFICATION forming part of Letters Patent No. 262,457, dated August 8, 1882.

Application filed April 10, 1882. (No specimens.) Patented in England January 4, 1882, No. 44.

*To all whom it may concern:*

Be it known that I, HENRY FRANCIS MILLS, a subject of the Queen of Great Britain and Ireland, and a resident of London, England, have invented an Improved Compound for Neuralgic Treatment, (for which British Letters Patent were granted to me, No. 44, dated January 4, 1882,) of which the following is a specification.

The object of my invention is to produce a medical compound which, while containing no deleterious ingredients, will form an effective remedy for treatment of neuralgia and similar complaints. This object I attain by means of a compound whose essential ingredients are solutions of hops, camphor, and sal-ammoniac, as more fully described hereinafter.

For the preparation of this compound I proceed in the following manner: I take two ounces of hops and place them in about two quarts of water. This decoction is boiled for the period of about one hour, and is then strained off. I reduce to powder four ounces of camphor. To assist this process I put twelve drops of spirits of wine to each ounce of camphor. This powdered camphor is then placed in a vessel and one quart of water is added. I prefer to use for this purpose a glazed earthenware jar. The jar or other vessel is then placed in a saucepan or other vessel containing water, and is boiled therein until the camphor is entirely dissolved. I also take eight ounces of sal-ammoniac and place them in one quart of cold water, and I stir this water until the sal-ammoniac is entirely dissolved. This solution of sal-ammoniac is mixed with the decoction of hops and the decoction of camphor hereinbefore described while these two decoctions are warm. The compound or mixture is then allowed to cool.

It will suffice that the hops and camphor and spirits of wine and sal-ammoniac hereinbefore mentioned are such as are usually described and called by those names; but I prefer to use the best and purest that can conveniently be gotten.

This compound or mixture is ready for use when cold, and may be taken and applied both internally and externally. For the internal application thereof I should take one teaspoonful at intervals of from five to seven minutes until the pain is removed. One dose will oftentimes be found sufficient. For the external application of this compound the parts affected may be bathed in the mixture, or the mixture may be rubbed in until the desired effect is produced. In severe cases I prefer to employ both the internal and the external methods of use. This treatment hereinbefore described will be found to entirely remove the pain of neuralgia or other analogous complaints; and it is obvious that this remedy may be used by the most delicate persons and as frequently as may be necessary, for there are no deleterious ingredients therein.

I claim as my invention—

The herein-described medical compound, consisting of a mixture of water, hops, camphor, and sal-ammoniac in about the proportions set forth.

In testimony whereof I have signed my name to this specification in the presence of two subscribing witnesses.

HENRY FRANCIS MILLS.

Witnesses:
 CHARLES BOND,
 JAMES HART.